United States Patent [19]
Fujikawa et al.

[11] 3,991,722
[45] Nov. 16, 1976

[54] ROTARY ENGINE OF THE TYPE COOLED BY AN AIR-FUEL MIXTURE INTAKE

[75] Inventors: Tetsuzo Fujikawa, Kobe; Shinichi Tamba, Kakogawa, both of Japan

[73] Assignee: Kawasaki Jukogyo Kabushiki Kaisha, Japan

[22] Filed: Aug. 18, 1975

[21] Appl. No.: 605,245

[30] Foreign Application Priority Data
Aug. 21, 1974  Japan .............................. 49-96484

[52] U.S. Cl. .......................... 123/8.13; 123/8.45; 418/86
[51] Int. Cl.² ...................................... F02B 53/04
[58] Field of Search ............ 123/8.01, 8.05, 8.13, 123/8.45, 8.09, 8.11; 418/86

[56] References Cited
UNITED STATES PATENTS

| | | | |
|---|---|---|---|
| 1,829,391 | 10/1931 | Bullington | 123/8.13 |
| 3,412,716 | 11/1968 | Tausch | 123/8.45 |
| 3,424,135 | 1/1969 | Tado | 123/8.45 X |
| 3,456,623 | 7/1969 | Weigert | 123/8.45 |
| 3,514,235 | 5/1970 | Yamauchi | 123/8.45 X |
| 3,548,790 | 12/1970 | Pitts | 123/8.45 |
| 3,780,707 | 12/1973 | Cole | 123/8.45 X |
| 3,905,337 | 9/1975 | Shimoji | 123/8.13 |

Primary Examiner—Clarence R. Gordon
Attorney, Agent, or Firm—McGlew and Tuttle

[57] ABSTRACT

A rotary engine wherein a side port is formed in one side housing, and a main peripheral port, communicating with the side port, and a bypass peripheral port, communicating with a bypass passage formed in another side housing, are formed in a rotor housing, the side port being maintained in communication with the carburetor through a passage formed in the rotor, while the bypass peripheral port communicates with the carburetor by bypassing the passage in the rotor. Respective valves are mounted in the main peripheral port and the bypass peripheral port, and the two valves are closed or throttled at low engine speeds. The bypass peripheral port opens at higher engine speeds than the main peripheral port.

6 Claims, 9 Drawing Figures

ROTARY ENGINE OF THE TYPE COOLED BY AN AIR-FUEL MIXTURE INTAKE

BACKGROUND OF THE INVENTION

This invention relates to rotary engines in general, and more particularly it is concerned with a Wankel rotary engine of the type which is cooled by an air-fuel mixture intake.

In one type of Wankel rotary engines of the prior art, the suction port is in the form of a side port, while in another type it is in the form of a peripheral port. Generally, the use of a side port as the suction port results in stability of performance of the engines at low speeds because it is possible to avoid overlapping of the suction port and the exhaust port, but has the disadvantage of being unable to obtain high power at high engine speeds because of the facts that the side port cannot be left open for a prolonged time interval and the area of its opening cannot be increased. Meanwhile, when the suction port is in the form of a peripheral port, it overlaps the exhaust port at low speeds and makes the engine performance unstable, but offers the advantage of enabling to obtaining high power at high speeds.

In engines of the type cooled by an air-fuel mixture, the rotor is cooled by an air-fuel mixture intake. In this type of engines, the rotor is heated at high engine speeds and the air-fuel mixture intake is heated by the rotor, thereby resulting in a greatly reduced charging efficiency and making it impossible to obtain high power. To eliminate this disadvantage, the usual practice is to use a bypass port in combination with the side port or the peripheral port, which permits an air-fuel mixture to be supplied direct to the combustion chamber without taking part in the cooling of the rotor.

FIG. 1 shows in sectional view one example of Wankel rotary engines of the type cooled by an air-fuel mixture intake of the prior art. In the figure, side housings are shown at 1 and 2 while a rotor housing is shown at 3. The numeral 4 designates a rotor, the numeral 5 a carburetor, and the numeral 6 a main passage. The numeral 7 refers to a side port, the numeral 8 to a bypass passage, the numeral 9 to a bypass peripheral port, the numeral 10 to a rotor bearing, and the numeral 11 to an eccentric shaft. In another example of Wankel rotary engines of the type described (not shown) of the prior art, the bypass peripheral port 9 is replaced by a bypass side port (not shown) which is formed in the side housing 2 and communicates with the bypass passage 8. The provision of the bypass peripheral port 9 or the bypass side port markedly reduces the resistance offered by the bypass passage 8 to the flow of the air-fuel mixture as compared with the resistance offered by the main passage 6 through the rotor 4. If the size of the bypass port is increased to improve charging efficiency by utilizing the reduction in resistance offered by the bypass passage to the flow of the air-fuel mixture, then the major part of the air-fuel mixture intake passes through the bypass passage 8 and the volume of the air-fuel mixture passing through the main passage 6 decreases. This results in insufficient cooling of the rotor 4, causing seizure between the rotor 4 and the side housings 1, 2 and seizure of the rotor bearing 10. Thus, limits are placed on the size of the bypass port. That is, in the construction shown in FIG. 1, the size of the bypass peripheral port would be restricted with a view to passing the air-fuel mixture through the main passage 6 in an amount sufficiently high to cool the rotor 4, so that the port would have little effect in obtaining high power. Moreover, since the side port 7 is provided in the main passage 6, there is the disadvantage of being unable to obtain high power due to the characteristics of a side port.

SUMMARY OF THE INVENTION

This invention obviates the aforementioned disadvantages of the prior art. Accordingly, the invention has as its object the provision of a rotary engine, of the type cooled by an air-fuel mixture intake, of a simple construction which enables cooling the rotor satisfactorily by an air-fuel mixture intake and yet obtaining high power.

In accordance with the present invention, main peripheral port, which can be opened over a prolonged time interval with an increased area of opening, is formed, in addition to the side port, for supplying an air-fuel mixture intake which is concerned with the cooling of the rotor, while the bypass port, in the form of a peripheral port, is also formed as in the prior art. This arrangement permits the rotor to be cooled with a higher degree of efficiency and at the same time enables obtaining high power by increasing both the time interval during which the suction port is opened and the area of opening thereof. The outstanding characteristic of the invention is that at least one side port is formed in one side housing, and a main peripheral port, communicating with the side port, and a bypass peripheral port, communicating with a bypass passage formed in the other side housing, are formed in a rotor housing, the side port being maintained in communication with a carburetor through a main passage including a passage in a rotor while the bypass peripheral port is maintained in communication with the carburetor through the bypass passage which does not include the passage in the rotor.

Additional and other objects and the features of the invention will become evident from the description set forth hereinafter when considered in conjunction with the accompanying drawings.

DETAILED DESCRIPTION OF THE PREFERRED EMBODIMENTS

Figure 1:
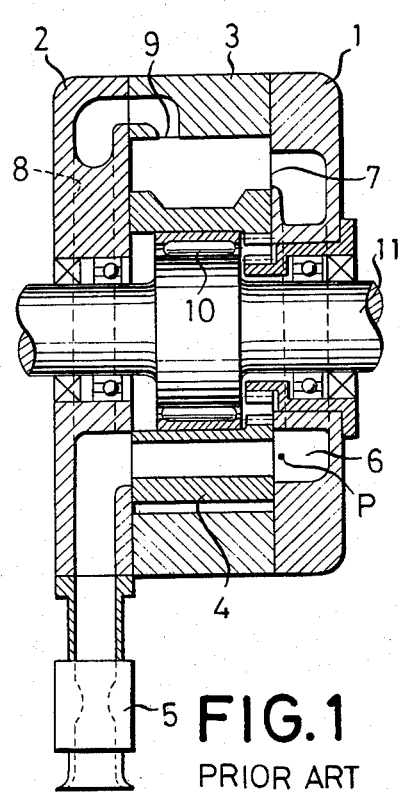
FIG. 1 is a sectional view of one example of the Wankel rotary engine of the type cooled by an air-fuel mixture intake of the prior art.
Figure 2:
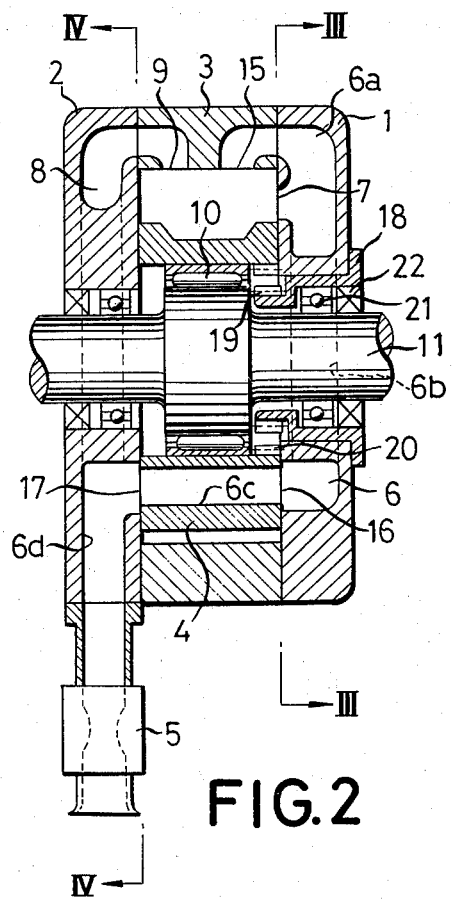
FIG. 2 is a sectional view of the Wankel rotary engine comprising a preferred embodiment of the invention.
Figure 3:
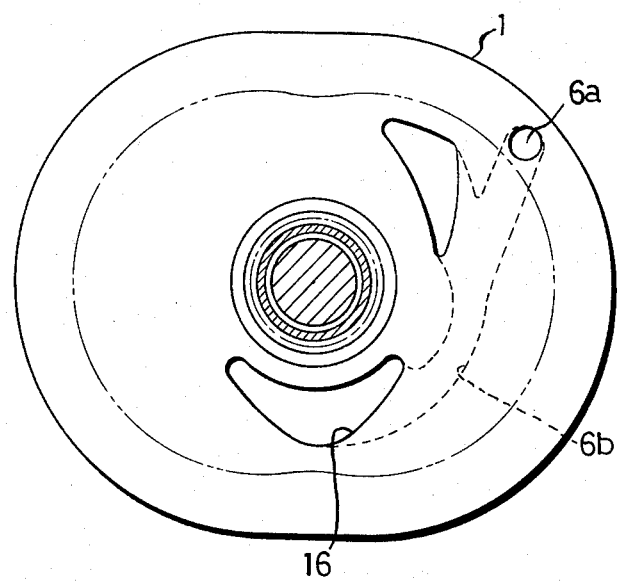
FIG. 3 is a view as seen in the direction of arrows III—III of FIG. 2.
Figure 4:
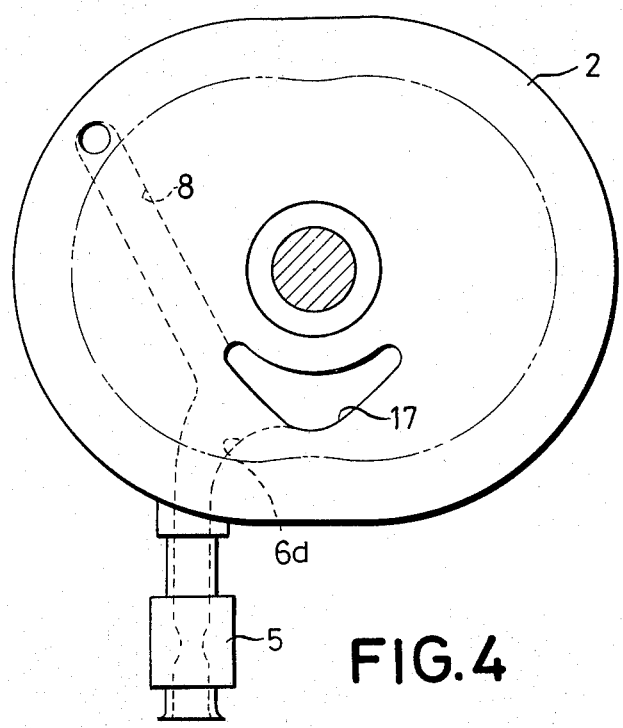
FIG. 4 is a view as seen in the direction of arrows IV—IV of FIG. 2.

FIG. 2 is a sectional view of the rotary engine comprising a preferred embodiment of the invention wherein like reference characters designates parts similar to those shown in FIG. 1. As shown, a main peripheral port 15 formed in the rotor housing 3 is maintained in communication with the side port 7 through a portion 6a of the main passage 6, the passage portion 6a being connected to a passage portion 6b disposed in the side housing 1 (See FIG. 3) which terminates at a side port 16 in the side housing 1, where the passage portion 6b is connected to a passage portion 6c disposed in the rotor 4. The passage portion 6c terminates at a side port 17 (See FIG. 4) where the passage portion 6c is connected to a passage portion 6d disposed in the side housing 2 and extends through the carburetor 5.

The bypass peripheral port 9 is disposed at one end of the bypass passage 8 which joins the passage portion 6d at the side port 17 (See FIG. 4) The numeral 18 designates a retainer affixed to the side housing 1 and formed with external teeth 19 which are adapted to mesh with internal teeth 20 formed in the rotor 4. The numeral 21 designates a bearing and the numeral 22 a seal.

Figure 5:
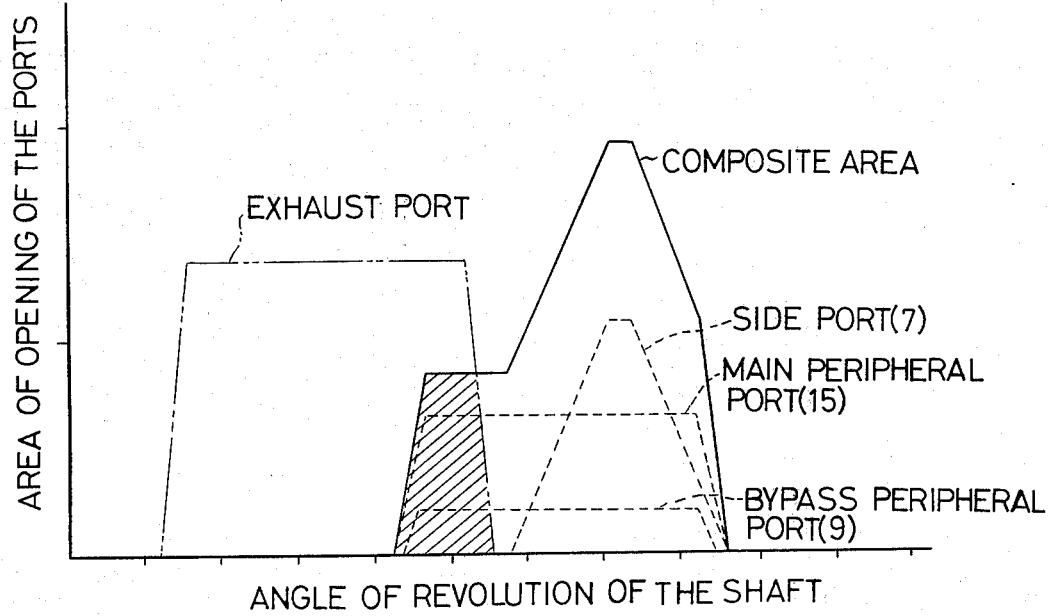
FIG. 5 is a graph showing the area of opening of the ports of the engine shown in FIG. 2.

FIG. 5 is a graph showing the relation between the area of the opening of the ports and the angle of revolution of the shaft in the rotary engine shown in FIG. 2. In the figure, it will be seen that the provision of the main peripheral port 15 in addition to the side port 7 has resulted in a great increase in the area of the opening of the ports in relation to the angle of revolution of the shaft and has made it possible to reduce as much as possible the resistance offered to the flow of the air-fuel mixture by the main passage 6, in spite of the fact that the main passage 6 includes portion 6c disposed in the rotor 4. This enables positively cooling the rotor 4 with ease. The use of the bypass peripheral port 9 in addition to the main peripheral port 15 and the side port 7 enables increasing charging efficiency and obtaining high power.

Figure 9:
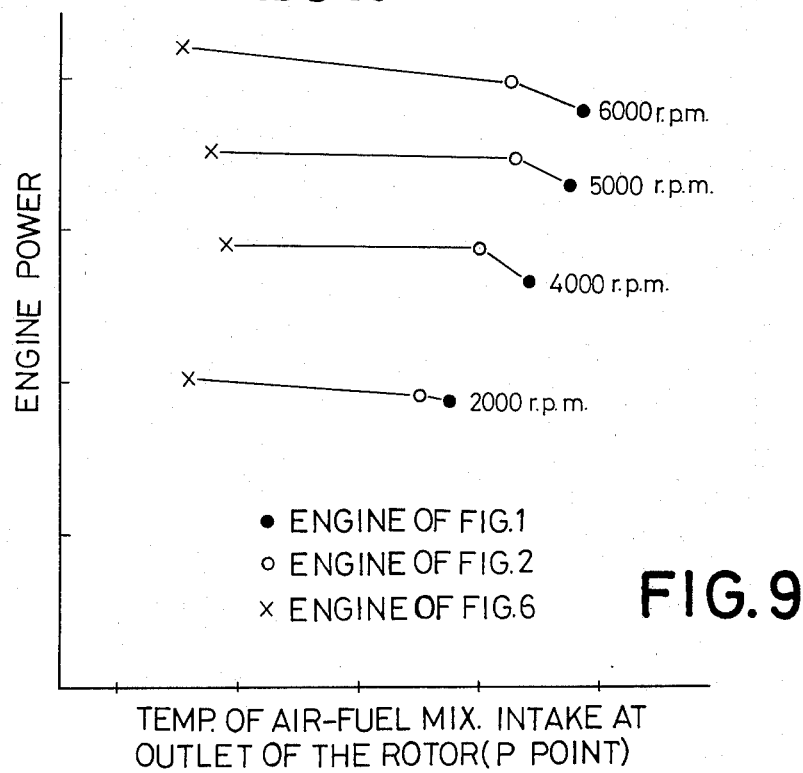
FIG. 9 is a graph showing the comparison of the engines shown in FIG. 1, FIG. 2 and FIG. 6 in performance.

FIG. 9 is a graph showing the comparision of the engines in performance. In the graph, the temperature of the air-fuel mixture at the outlet of the rotor is a value obtained at a point P (See FIG. 1) when the throttle valve has been brought to a fully closed position immediately after the power has been measured at wide-open throttle. The temperature of the air-fuel mixture at the outlet of the rotor reaches the highest level at this time and consequently seizure between the rotor and the side housing, or in the rotor bearing, tends to develop. In the case of a rotary engine, the critical temperature for the developing of seizure is considered to be in a range from 160° to 180° C. It will be seen in FIG. 9 that the values indicated by black dots, which represent the rotary engine of the prior art shown in FIG. 1, are substantially in the critical temperature range. It will be seen that, when the port arrangement shown in FIG. 2 is incorporated in the ratary engine, the temperature of the air-fuel mixture at the outlet of the rotor is reduced and power is increased, as indicated by white dots, over a wide range of engine speeds.

Figure 6:
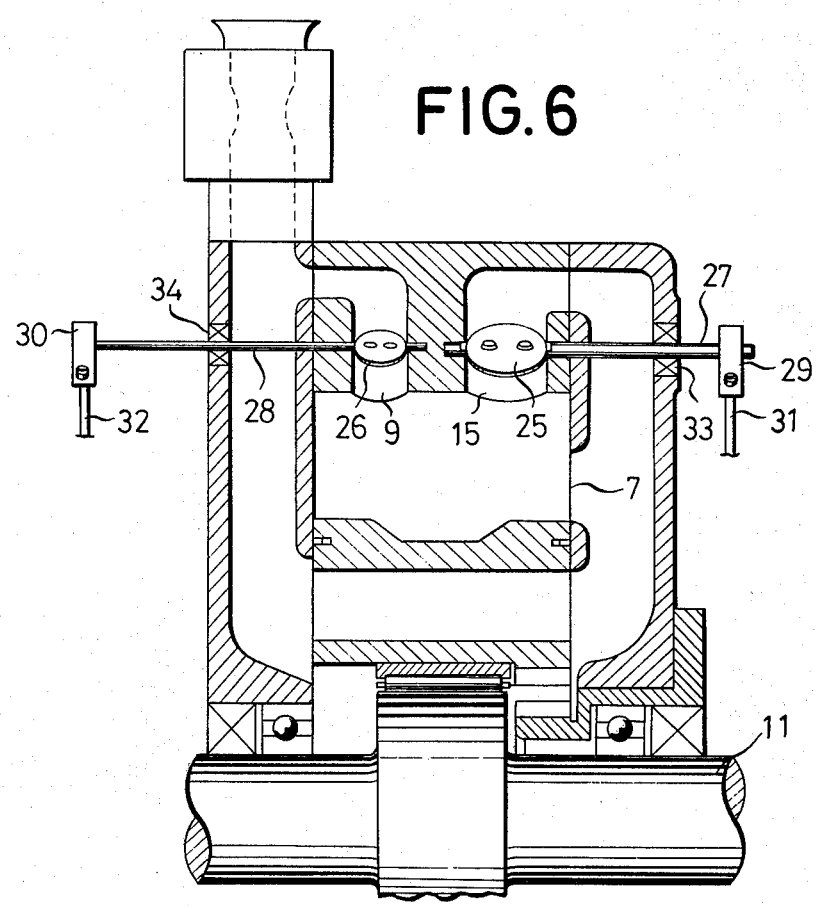
FIG. 6 is a sectional view of the rotary engine according to the invention showing valves mounted in the main and bypass peripheral ports.
Figure 7:
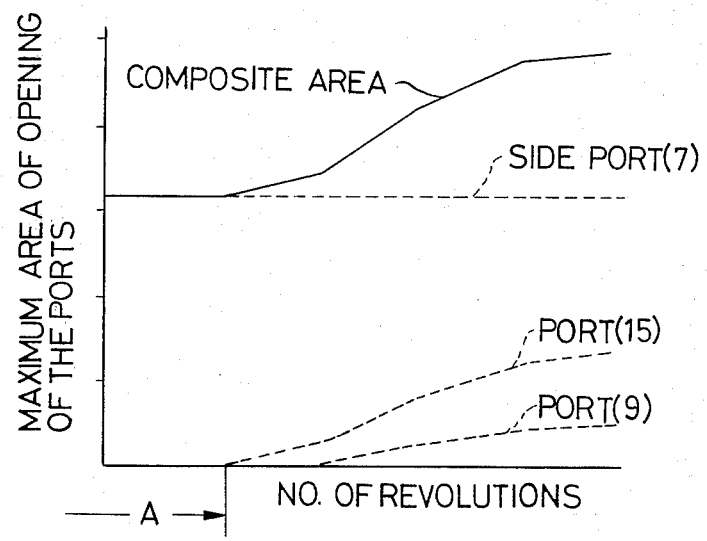
FIG. 7 is a graph showing the maximum area of opening of the ports of the engine shown in FIG. 6.

As aforesaid, the provision of the main peripheral port 15 in addition to the side port 7 has the effect of positively cooling the rotor 4 and increasing the power of the engine. It also been found that, if overlapping (as indicated by hatching in FIG. 5) of the suction port and the exhaust port can be prevented at low engine speeds or at light loads, it is possible to avoid the blow-by of a fresh air-fuel mixture and to improve the operation condition. FIG. 6 shows a device comprising butterfly valves 25 and 26 adapted to open and close the main peripheral port 15 and the bypass peripheral port 9, respectively. The numerals 27 and 28 designate shafts adapted to rotate with the valves 25 and 26, respectively, as a unit. The numerals 29 and 30 designate levers supported by the shafts 25 and 26, respectively. The numerals 31 and 32 designate operation cables, and the numerals 33 and 34 are seals. The two cables 31 and 32 are connected to a governor (not shown) driven by the engine. The area of opening of the ports in relation to the engine speeds is set as shown in FIG. 7. By this arrangement, it is possible to eliminate the overlapping of the peripheral port, for an air-fuel mixture intake and the exhaust port as indicated by the hatched portion in FIG. 5, which occurs at a low engine speed range A (See FIG. 7) at which the blow-by of a fresh air-fuel mixture tends to occur if a peripheral port for an air-fuel mixture is provided. This is conducive to positive prevention of the blow-by of a fresh air-fuel mixture and increased engine power. The improved engine power is indicated by the symbol X in the graph shown in FIG. 9.

A shown in FIG. 7, the area of opening of the two peripheral ports 15 and 9 slowly increases as the engine speed increases. In this case, there is the advantage of the performance of the engine being stable at all engine speeds. The degree of opening of throttle valve can also be utilized as means for detecting the low engine speeds at which the blow-by tends to occur. Generally, engine speeds are low at light loads when the degree of opening of the throttle valve is low. This makes it possible to couple the operations cables 31 and 32 of FIG. 6 to the throttle valve. In this case, the governor mechanism for detecting the engine speeds can be done without and it is possible to achieve results, in preventing the blow-by, which are satisfactory for practical purposes.

In cooling the rotor, it is advantageous that the bypass peripheral port 9 should open at a higher engine speed than the main peripheral port 15, as shown in FIG. 7. When the engine speed is low, the volume of the air-fuel mixture intake is small. Thus, if the bypass peripheral port were opened at this time, the fuel-air mixture intake, passing through the main passage and cooling the rotor, would be reduced in volume, thereby cooling the rotor unsatisfactorily. However, upon an increase of the engine speed, the volume of air-fuel mixture intake increases, thereby making it possible to open the bypass peripheral port while cooling the rotor satisfactorily.

Figure 8:
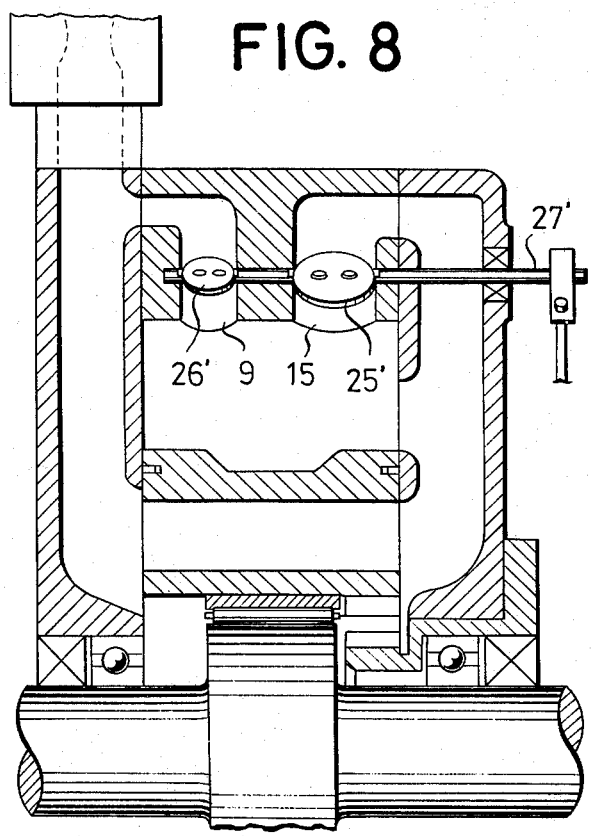
FIG. 8 is a sectional view of the rotary engine according to the invention showing control means for controlling the main and bypass peripheral ports.

The opening and closing of the main peripheral port 15 and the bypass peripheral port 9 can be advantageously controlled by valves 25' and 26' mounted in the ports 15 and 9, respectively, and fixedly supported by a single shaft 27', as shown in FIG. 8. This arrangement offers the advantage of simplifying the port opening control mechanism.

We claim:

1. A rotary engine, of the type cooled by an air-fuel mixture intake, comprising, in combination, a first side housing having at least one side port formed therein; a second side housing; a rotor housing disposed between said first and second side housings and having a main peripheral port formed therein and communicating with said at least one side port; a by-pass peripheral port formed in said rotor housing and communicating with the by-pass passage formed in said second side housing; and a carburetor; said side port communicating with said carburetor through a main passage including a passage portion formed in said rotor, and said by-pass peripheral port communicating with said carburetor through a by-pass passage independent of said passage portion formed in said rotor.

2. A rotary engine as claimed in claim 1, further comprising respective valves opening and closing said main peripheral port and said by-pass peripheral port; said valves being at least moved toward a closed position at least when the engine is operating at low speeds.

3. A rotary engine as claimed in claim 2, in which said valves are arranged for operation independently of each other.

4. A rotary engine, as claimed in claim 2, in which said valves are arranged for conjoint operation.

5. A rotary engine as claimed in claim 2 wherein said bypass peripheral port opens at a higher engine speed than said main peripheral port.

6. A rotary engine as claimed in claim 2 further comprising control means for opening and closing said main peripheral port valve and said bypass peripheral port valve.

* * * * *